J. RINGEN.
DESIGN FOR A SAUCEPAN.
No. 10,718. Reissued May 4, 1886.
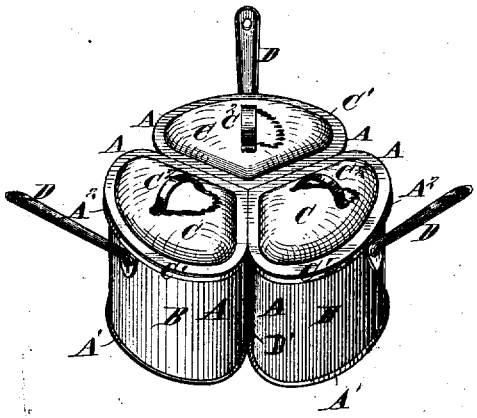
Attest:
F. A. Hopkins
Geo. S. Wheelock
Inventor:
Jno Ringen.
By Knight Bro
Attys

UNITED STATES PATENT OFFICE.

JOHN RINGEN, OF ST. LOUIS, MISSOURI.

DESIGN FOR A SAUCEPAN.

SPECIFICATION forming part of Reissued Design No. 10,718, dated May 4, 1886.

Original No. 16,566, dated March 9, 1886. Term of patent 14 years. Application for reissue filed April 8, 1886. Serial No. 198,288.

*To all whom it may concern:*

Be it known that I, JOHN RINGEN, a citizen of the United States, residing in the city of St. Louis, State of Missouri, have invented and produced a new and original Design for Saucepans, of which the following is a specification, reference being had to the accompanying drawing, forming part thereof, and which is a perspective view of my new design of pan.

My design consists in a body, A, of approximately heart shape in plan view, a bead-like figure, A′, surrounding the bottom, a bead-like figure, $A^2$, surrounding the upper portion beneath the top, a raised portion, C, at top, surrounded by a flat portion, C′, an oblique arm, D, projecting from the rounded part B, and an arched strip, $C^2$, in the center of the raised portion in line with the arm and point of the body. Three of these saucepans designed as described and arranged as shown leave spaces D′ between them.

Having thus described my design for a saucepan, the following is what I claim as of my invention and production, and desire to secure by Design Letters Patent:

The design for a saucepan herein shown and described, consisting of an approximately heart-shaped body, A, in plan view, a bead-like projection, A′, surrounding the bottom, a bead-like projection, $A^2$, surrounding the upper portion beneath the top, a raised portion, C, at the top, a flat portion, C′, surrounding the raised portion, an oblique arm, D, projecting from the rounded part B, and an arched strip, $C^2$, on the raised portion in line with the arm and point of the body.

JOHN RINGEN.

In presence of—
GEO. H. KNIGHT,
SAML. KNIGHT.